United States Patent
Nishino et al.

(10) Patent No.: US 8,869,547 B2
(45) Date of Patent: Oct. 28, 2014

(54) AIR CONDITIONER OF TRACK SYSTEM VEHICLE

(75) Inventors: Masaya Nishino, Mihara (JP); Toru Kanemori, Mihara (JP); Osamu Kawaguchi, Tokyo (JP); Ayako Tanabe, Tokyo (JP)

(73) Assignees: Mitsubishi Heavy Industries, Ltd., Tokyo (JP); Kabushiki Kaisha Toshiba, Tokyo (JP)

( * ) Notice: Subject to any disclaimer, the term of this patent is extended or adjusted under 35 U.S.C. 154(b) by 607 days.

(21) Appl. No.: 12/726,781

(22) Filed: Mar. 18, 2010

(65) Prior Publication Data

US 2010/0242513 A1   Sep. 30, 2010

(30) Foreign Application Priority Data

Mar. 25, 2009   (JP) .................. 2009-073043

(51) Int. Cl.
*B60H 1/32* (2006.01)
*B61D 27/00* (2006.01)
*B60H 1/00* (2006.01)

(52) U.S. Cl.
CPC ........ *B60H 1/00371* (2013.01); *B61D 27/0018* (2013.01); *B60H 2001/00235* (2013.01)
USPC .............. 62/239; 62/244; 62/259.1; 454/137; 454/99; 454/233; 454/248; 454/232

(58) Field of Classification Search
USPC ................... 62/239, 244; 454/144, 140, 248, 454/232–233, 99–100, 105, 136–139
See application file for complete search history.

(56) References Cited

U.S. PATENT DOCUMENTS

| | | | | |
|---|---|---|---|---|
| 3,855,814 A | * | 12/1974 | Eubank | 62/244 |
| 3,862,549 A | * | 1/1975 | Fernandes | 62/419 |
| 4,134,275 A | * | 1/1979 | Erickson et al. | 62/244 |
| 4,201,064 A | * | 5/1980 | Krug et al. | 62/239 |
| 4,217,764 A | * | 8/1980 | Armbruster | 62/323.1 |
| 4,424,684 A | * | 1/1984 | Waldschmidt et al. | 62/239 |
| 4,732,011 A | * | 3/1988 | Haiya | 62/244 |
| 4,787,210 A | * | 11/1988 | Brown | 62/89 |
| 4,888,959 A | * | 12/1989 | Brown | 62/244 |
| 4,982,583 A | * | 1/1991 | Matsuda et al. | 62/244 |

(Continued)

FOREIGN PATENT DOCUMENTS

| | | | |
|---|---|---|---|
| JP | 54169305 | * | 5/1978 |
| JP | S56-006612 U | | 1/1981 |

(Continued)

OTHER PUBLICATIONS

Japan Patent Office, "Office Action" for JP 2009-073043, Jul. 24, 2012.

(Continued)

*Primary Examiner* — Frantz Jules
*Assistant Examiner* — Martha Tadesse
(74) *Attorney, Agent, or Firm* — Manabu Kanesaka; Benjamin Hauptman; Kenneth Berner (57) ABSTRACT

An air conditioner of a track system vehicle includes two air conditioning units disposed in parallel in a horizontal direction and mounted on the roof of a vehicle, a plurality of outlets of two air conditioning units facing a vehicle center side, a first duct connecting two air conditioning units, and a second duct which bypasses to the vehicle ends.

8 Claims, 6 Drawing Sheets

(56) References Cited

U.S. PATENT DOCUMENTS

| | | | |
|---|---|---|---|
| 5,001,905 A * | 3/1991 | Miyazaki | 62/244 |
| 5,307,645 A * | 5/1994 | Pannell | 62/244 |
| 5,389,035 A * | 2/1995 | Ishida et al. | 454/99 |
| 5,531,641 A * | 7/1996 | Aldrich | 454/100 |
| 5,605,055 A * | 2/1997 | Salgado | 62/244 |
| 6,282,912 B1 * | 9/2001 | Mannerheim | 62/244 |
| 6,295,826 B1 * | 10/2001 | Lee | 62/244 |
| 6,698,220 B2 * | 3/2004 | Yoneno et al. | 62/184 |
| 6,718,784 B1 * | 4/2004 | Bushnell | 62/244 |
| 6,763,669 B1 * | 7/2004 | Bushnell et al. | 62/115 |
| 6,763,670 B1 * | 7/2004 | Bushnell et al. | 62/200 |
| 6,910,529 B2 * | 6/2005 | Stone et al. | 165/299 |
| 7,051,544 B2 * | 5/2006 | Hille et al. | 62/244 |
| 7,434,611 B2 * | 10/2008 | Wunderlich et al. | 165/202 |
| 7,931,209 B2 * | 4/2011 | Mola et al. | 236/44 C |
| 2005/0210892 A1 * | 9/2005 | Reinders | 62/121 |
| 2006/0000592 A1 * | 1/2006 | Bosquet et al. | 165/202 |
| 2011/0061414 A1 * | 3/2011 | McAllister et al. | 62/244 |
| 2013/0295832 A1 * | 11/2013 | Cermak et al. | 454/108 |

FOREIGN PATENT DOCUMENTS

| | | | |
|---|---|---|---|
| JP | 59128405 | * | 8/1984 |
| JP | S59-128405 U | | 8/1984 |
| JP | S60-057413 U | | 4/1985 |
| JP | S60-092923 A | | 5/1985 |
| JP | H01-174283 U | | 12/1989 |
| JP | H02-145508 U | | 12/1990 |
| JP | H04-119265 U | | 10/1992 |
| JP | H10-152051 A | | 6/1998 |
| JP | 2003-048536 | | 2/2003 |
| JP | 2006-297964 | | 11/2006 |
| JP | 2008-120309 | | 5/2008 |

OTHER PUBLICATIONS

Japan Patent Office, "Notice of Allowance for JP 2009-073043", Jun. 25, 2013.

* cited by examiner

Cross-section along line A - A

Cross-section along line B - B

FIG. 12

Cross-section aling line C - C

… (1) …

AIR CONDITIONER OF TRACK SYSTEM VEHICLE

RELATED APPLICATIONS

The present application is based on, and claims priority from Japanese Application Serial Number JP2009-073043, filed Mar. 25, 2009, the disclosure of which is hereby incorporated by reference herein in its entirety.

BACKGROUND OF THE INVENTION

1. Field of the Invention

The present invention relates to an air conditioner which is applied to a track system vehicle such as a railway vehicle, allows a height of the vehicle to be kept low, and also allows an interior space of the vehicle to be secured.

2. Description of the Related Art

It is often the case that an air conditioner of a track system vehicle such as a railway vehicle is mounted on a roof of the vehicle as a unit type. Or, a separation type of air conditioner divided into an indoor unit and an outdoor unit is adopted. A unit type of air conditioner is greatly protruded from a roof, or is often embedded on the order of half in a ceiling so as to reduce the protrusion amount from the ceiling.

In the separation type, the indoor unit is able to be made into a small size, so that there are many air conditioners having a structure in which the indoor units are embedded in ceiling portions on both end sides of a vehicle so as to blow cold wind toward the center of the vehicle. Also, the outdoor unit is disposed under a floor of a vehicle body.

Recently, a transport system has come into widespread use which is called a so-called new traffic system which travels in an exclusive track by using rubber tires so as to perform heavy-weight transport. The transport system largely performs unmanned full-automatic operation, and there is also a case where the system has guide wheels which are guided, for example, by a guide track.

Since a vehicle of the new traffic system has a vehicle length of about half of the length of a general railway vehicle and is provided in an urban space or adopted as airport facilities, restrictions are imposed to the height and the vehicle body width.

Therefore, if the unit type air conditioner is mounted on a roof of the vehicle of the new traffic system as it is, the protrusion amount from the roof is large. Also, it is necessary to make a height of the vehicle be high, so that a track occupation cross-section area is increased. Also, since a heavy object is mounted on the roof, stability of the vehicle becomes poor. As a result, there is also a case where falling wind speed resistance is reduced, so that a problem occurs in stability.

If most of the unit type air conditioner is embedded in a ceiling of the vehicle, the protrusion amount from the roof can be suppressed. However, the ceiling height in the interior of the vehicle is lowered, so that there is a strong feeling of oppression and occupant comfort is adversely affected.

In the separation type air conditioner, a vehicle exterior unit is disposed under a floor of the vehicle body. However, in the case of a system which travels as a single vehicle, a space under the floor is occupied by a drive braking device or control device and signal and communication devices, so that it is not possible to secure a space for mounting the outdoor unit of the air conditioner.

Therefore, in Patent Document 1 (Japanese Patent Application Laid-Open No. 2006-297964) or Patent Document 2 (Japanese Patent Application Laid-Open No. 2008-120309), there is disclosed an on-roof installation type air conditioner for a railway vehicle, which allows a vehicle height to be reduced by disposing constituent devices in parallel in a transverse direction on the roof.

However, even with the use of such an air conditioner, it is not possible to eliminate the protrusion amount from the roof, or downward protrusion from a ceiling face of the interior of the vehicle, and a problem remains with the above-mentioned vehicle stability or comfort of the interior of the vehicle.

Further, since there are restrictions on the direction of air which is blown from the air conditioner, unevenness occurs in the flow of the blown air in the vehicle, so that there is a problem in that it is not possible to uniformly air-condition the atmosphere in the interior of the vehicle.

SUMMARY OF THE INVENTION

In view of the problems of the above-mentioned prior arts, it is an object of the present invention to realize an air conditioner which, in a track system vehicle, allows an interior space of the vehicle to be felt to be wide by maintaining a ceiling of the vehicle high, allows the protrusion amount from a roof to be kept low, and is able to uniformly air-condition the atmosphere in the interior of the vehicle.

In order to achieve the object, according to an aspect of the present invention, there is provided an air conditioner of a track system vehicle, including an air conditioning unit which has constituent devices disposed in parallel in a transverse direction and is mounted on a roof of the vehicle, wherein the air conditioning unit is provided close to an end portion in a longitudinal direction of the vehicle, outlets for air-conditioned air are disposed facing a center side of the vehicle, some of the outlets are connected to first ducts, which are disposed in a longitudinal direction of the vehicle along a back face of the roof and have outlets which face downward, and remaining outlets are connected to second ducts, which bypass along the back face of the roof from the outlets to a vehicle end side, on which the air conditioning unit is mounted, thereby being disposed up to a vehicle end, and have outlets which face downward.

In the present invention, the air conditioning unit which is made into a flat shape by disposing the constituent devices of the air conditioner in parallel in a transverse direction at the roof portion of the vehicle is mounted in a semi-embedded form on the roof, so that the protrusion amount of the air conditioner from the roof is able to be kept low, whereby a height of the vehicle is able to be kept low. At the same time, since a ceiling face is able to be maintained high, an interior space of the vehicle is felt to be wide, so that comfort is increased, whereby comfortable ride is obtained.

Also, since the air conditioning unit is mounted close to an end portion in a longitudinal direction of the vehicle, with respect to the first ducts which extend long in a longitudinal direction in the ceiling face of the vehicle, the flow of the air-conditioned air to the first ducts is improved by making the outlets for the air-conditioned air face the first duct side. Also, lengths of the second ducts which bypass to the vehicle end side are shortened, so that a pressure loss of the air-conditioned air which flows in the second ducts is reduced, whereby reduction in the air volume of the air-conditioned air in the second ducts is able to be prevented.

Therefore, the air-conditioned air is able to be uniformly blown from the first ducts and the second ducts, so that the atmosphere in the interior of the vehicle is able to be uniformly air-conditioned.

In addition, in the present invention, two air conditioning units may also be respectively mounted close to both end portions in a longitudinal direction of the vehicle and connected to each other by the first ducts. Therefore, the atmosphere in the interior of the vehicle is able to be further uniformly air-conditioned.

In the present invention, the air conditioning unit may also be 1-layered, and a vehicle exterior air suction fan, a vehicle interior air suction fan, a discharging fan, and air-conditioned air outlets, out of the constituent devices may also be disposed in the order from the vehicle end side toward the vehicle center side.

Therefore, the air conditioning unit is able to be made into a flat shape, so that a height of the vehicle is able to be kept low, and also the ceiling face of the interior of the vehicle is able to be maintained high. Further, arrangement of the constituent devices for disposing the outlets for the air-conditioned air to face from the vehicle end side toward the vehicle center side is able to be simplified, and a height of the ceiling is able to be maintained high.

In addition, the first ducts are embedded in the ceiling face of the vehicle, so that the ceiling face of the vehicle is able to be maintained higher.

In addition, in the present invention, the air conditioning unit may also be 2-layered, and a condenser, a compressor, and a vehicle exterior air suction fan, out of the constituent devices may also be disposed on an upper layer, and on a lower layer, a vehicle interior air suction fan, a discharging fan, and air-conditioned air outlets may also be disposed in the order from the vehicle end toward a vehicle center side.

Therefore, since the air-conditioned air outlets are able to be disposed closer to the vehicle end side, a region of a high ceiling face of a vehicle center portion is able to be enlarged.

Further, an air conditioning region by the first ducts is enlarged, so that air conditioning in the interior of the vehicle is able to be further uniformly performed, whereby comfort is able to be improved.

Further, since the second ducts are able to be shortened, pressure losses in the second ducts are able to be reduced, so that reduction in air volume in the second ducts is able to be prevented.

According to the present invention, in an air conditioner of a track system vehicle, including an air conditioning unit which has constituent devices disposed in parallel in a transverse direction and is mounted on a roof of the vehicle, the air conditioning unit is provided close to an end portion in a longitudinal direction of the vehicle, outlets for air-conditioned air are disposed facing a center side of the vehicle, some of the outlets are connected to first ducts, which are disposed in a longitudinal direction of the vehicle along a back face of the roof and have outlets which face downward, and remaining outlets are connected to second ducts, which bypass along the back face of the roof from the outlets to a vehicle end side, on which the air conditioning unit is mounted, thereby being disposed up to a vehicle end, and have outlets which face downward. By such a configuration, the ceiling of the vehicle is maintained high, so that a space in the interior of the vehicle is felt to be wide. Also, since the protrusion amount from the roof is able to be kept low, the stability of the vehicle is able to be maintained. Further, the atmosphere in the interior of the vehicle is able to be uniformly air-conditioned.

DESCRIPTION OF THE PREFERRED EMBODIMENTS

Hereinafter, the present invention will be described in detail by using embodiments illustrated in the drawings. However, dimensions, materials, shapes, relative arrangement, and so on of constituent parts which are described in the embodiments are not intended to limit the scope of the invention only thereto, unless specific description is particularly provided.

(Embodiment 1)

Figure 1:
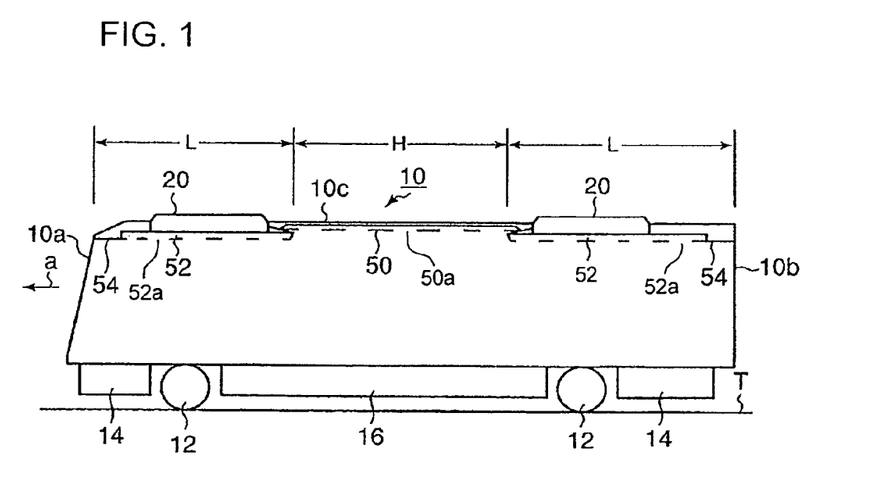
FIG. 1 is a cross-sectional view, as viewed in front, of a track system vehicle equipped with an air conditioner according to a first embodiment of the present invention.
Figure 2:
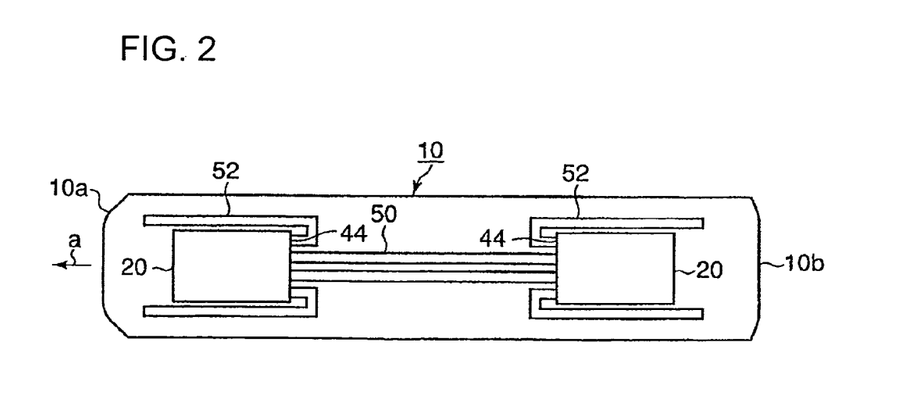
FIG. 2 is a cross-sectional view, as viewed in plan, of the track system vehicle.
Figure 3:
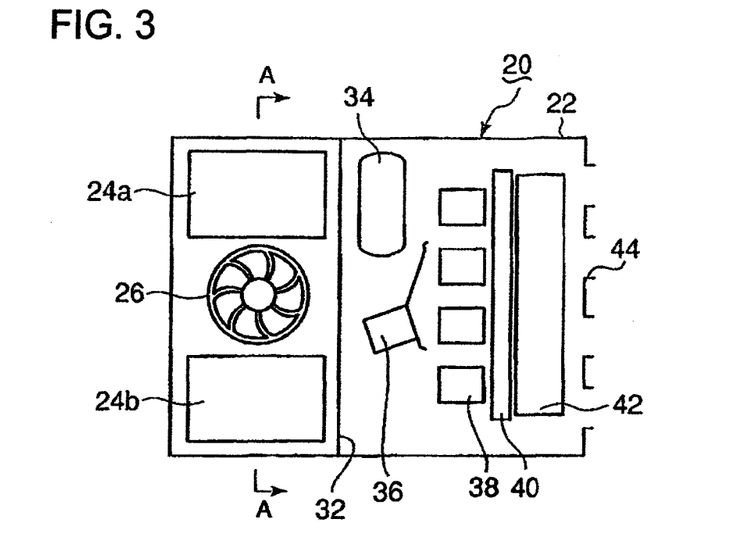
FIG. 3 is a cross-sectional view, as viewed in plan, of an air conditioning unit mounted on the track system vehicle.
Figure 4:
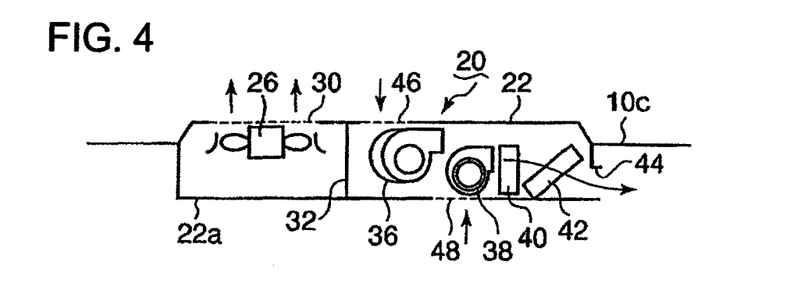
FIG. 4 is a cross-sectional view, as viewed in front, of the air conditioning unit.
Figure 5:
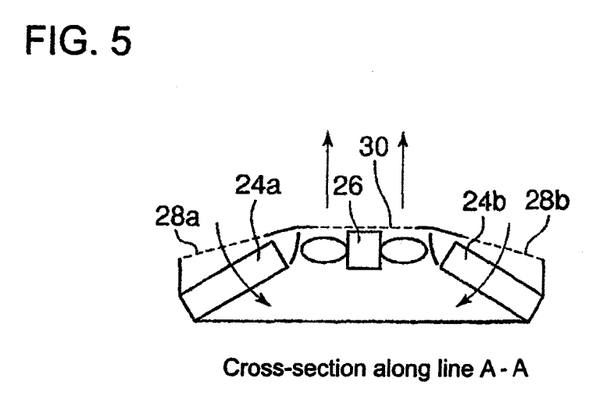
FIG. 5 is a cross-sectional view taken along line A-A of FIG. 3.
Figure 6:
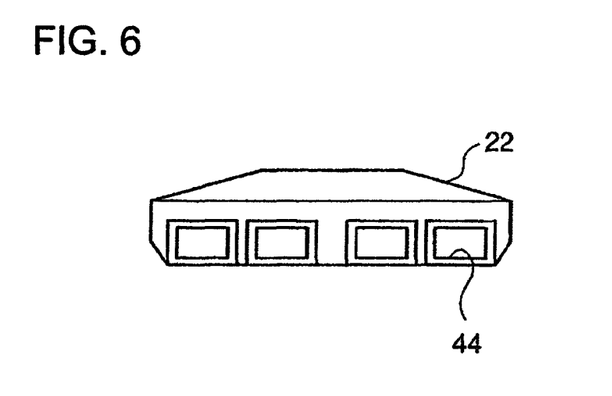
FIG. 6 is a right side view of the air conditioning unit.

A track system vehicle equipped with an air conditioner according to a first embodiment of the present invention is described based on FIGS. 1 to 6. FIGS. 1 and 2 illustrate a lead vehicle 10 of a new traffic system. A vehicle of a new traffic system travels on an exclusive track T by using rubber tires 12. An under-floor device 16, such as power-supply devices such as an electric motor, a battery, a SIV, and a VVVF inverter, or a compressor which produces compressed air to be supplied to a brake device, is mounted under a vehicle body floor between the rubber tires 12. Also, vehicle end devices 14 such as couplers are mounted between rubber tires 12 and vehicle ends.

The lead vehicle 10 has a front end side denoted by reference number 10a and travels in a direction of an arrow a. Two air conditioning units 20 are mounted in a semi-embedded form on a roof 10c of the lead vehicle 10 in the vicinity of the front end 10a and a rear end 10b of the vehicle. A configuration of the air conditioning unit 20 is described below with reference to FIGS. 3 to 6.

The air conditioning unit 20 illustrated in FIGS. 3 to 6 is the air conditioning unit 20 disposed on the front end 10a side of the lead vehicle 10, and hereinafter, a configuration of the air conditioning unit 20 will be described by taking the air conditioning unit 20 as an example. The air conditioning unit 20 is provided with devices such as a condenser, a compressor, and an evaporator, which constitute a refrigerating cycle. A casing 22 of the air conditioning unit 20 is made into a flat shape and is embedded in the roof 10c up to a height of half or more of the casing 22. The constituent devices are disposed in parallel in a horizontal direction in the inside of the casing 22.

In the casing 22 of the front end side, a pair of condensers 24a and 24b are disposed in a vehicle width direction, and a fan 26 is disposed between the condensers 24a and 24b. Vents 28a, 28b, and 30 are respectively provided in portions of the casing, which face the condensers 24a and 24b and the fan 26. Outer air enters into the casing 22 through the vents 28a and 28b by operation of the fan 26, refrigerates the condensers 24a and 24b, and is then discharged to the exterior of the casing 22 through the vent 30.

A compressor 34 and a ventilation fan 36 are disposed in a space on a vehicle center side of the casing 22 across a partition 32. Four fans 38 are disposed in a vehicle width direction near to the right side of the ventilation fan 36. A heater 40 is disposed near to the right side of the fans 38, and an evaporator 42 is disposed near to the right side of the heater 40. Also, four outlets 44 are disposed in a vehicle width direction at an end on a vehicle center side of the casing 22.

In such a configuration, outer air is introduced through a vent 46 by the ventilation fan 36, and also, air in the interior of the vehicle is introduced through a vent 48 by the fans 38. At the time of the cooling operation, the air introduced from the interior and the exterior of the vehicle is refrigerated by the evaporator 42 and the cooled air is supplied from the outlets 44 to the interior of the vehicle through first ducts 50 and second ducts 52, which will be described later.

At the time of the heating operation, operation of constituent devices of the refrigerating cycle is stopped, and only the heater 40 is operated by a power-supply device (not illustrated). In this way, the interior and the exterior air of the vehicle introduced from the vents 46 and 48 is warmed by the heater 40 and the warmed air is supplied to the interior of the vehicle through the outlets 44.

In FIGS. 1 and 2, two air conditioning units 20 are disposed such that the outlets 44 face each other. Also, two outlets 44 on the inner side in a vehicle width direction, out of four outlets 44 of each of two air conditioning units 20 are connected to two first ducts 50. The first ducts 50 are embedded in a ceiling face of the vehicle, so that the first ducts do not protrude downward from the ceiling face, and the lower faces of the first ducts 50 are flush with the ceiling face.

Also, the second ducts 52 are respectively connected to the outlets 44 on both end sides in a vehicle width direction of two air conditioning units 20. The second ducts 52 bypass directly from the outlets 44, thereby passing by both sides of the casing 22 and extending up to the front end and the rear end of the vehicle in a horizontal direction. The lower faces of the second ducts 52 are disposed so as to be flush with a lower face 22a of the casing 22 and the ceiling faces 54 of the front and rear ends of the vehicle.

A number of air outlets 50a and 52a are dispersed and provided in the lower faces of the first ducts 50 and the second ducts 52 respectively, so that air-conditioned air is able to be blown from the air outlets.

According to this embodiment, the constituent devices of the air conditioning unit 20 are disposed in parallel in a horizontal direction, so that the casing 22 of the air conditioning unit 20 is able to be made into a flat shape, and further, the casing 22 is half-embedded in the roof, so that the protrusion amount of the casing 22 from the roof is able to be minimized, and also, the ceiling face of the interior of the vehicle is able to be maintained high. Therefore, problems of the height of the vehicle and the height of the center of gravity are able to be solved, so that a design of the vehicle is able to be improved.

Further, the ceiling face of a vehicle center side region H is able to be made higher by disposing two air conditioning units 20 in the vicinity of the front and rear ends of the vehicle and also embedding the first ducts 50, which connect the outlets 44, in the ceiling face. Therefore, a space of the interior of the vehicle is able to be felt to be wide, so that comfort is able to be increased, whereby comfortable ride is obtained.

Further, pressure loss of the air-conditioned air in the first ducts 50 is able to be reduced by making the outlets 44 face in a horizontal direction and connecting the outlets 44 to the first ducts 50 disposed in a horizontal direction, so that the blowing of the air-conditioned air is able to be uniformly performed over the entire lengths of the first ducts 50.

Further, since the air-conditioned air is blown from the first ducts 50 and the second ducts 52 and air which is not air-conditioned is sucked in from the vent 48 located away from the first and second ducts, a cooling effect or a heating effect of air in the interior of the vehicle is able to be improved.

Further, the lengths of the bypassing second ducts 52 are able to be shortened by disposing the air conditioning units 20 on end sides of the vehicle, so that pressure loss in the second ducts 52 is able to be reduced, and also vehicle end side regions L, where ceiling faces are low compared to the central region H, are able to be minimized.

Incidentally, in this embodiment, the fans 38 are used for both the suction of air in the interior of the vehicle and the blowing of the air-conditioned air. However, the suction and the blowing may also be respectively performed by separate fans.

Further, in a case where only cooling is performed without providing the heater 40, the fans 38 are provided on the downstream side of the evaporator 42, so that the blowing of the air-conditioned air is performed. In this case, it is preferable to separately provide a fan for the suction of air in the interior of the vehicle.

(Embodiment 2)

Next, a second embodiment of the present invention will be described based on FIGS. 7 to 12. An air conditioning unit of this embodiment is an air conditioner which is not provided with a heater, and is provided with only a device constituting a refrigerating cycle, so as to perform only cooling. An air conditioning unit 60 of this embodiment will be described below based on FIGS. 9 to 12.

The air conditioning unit 60 illustrated in FIGS. 9 to 12 is an air conditioning unit on the front end 10a side of the vehicle. The air conditioning unit 60 has a casing 62 which is 2-layered, a ventilation fan 64 is mounted on a vehicle end side of an upper layer 62a, and a compressor 66 constituting a refrigerating cycle is disposed near to the right side of the ventilation fan 64. Outer air is introduced through vents 68 provided in both side faces of the upper layer 62a by operation of the ventilation fan 64, and the introduced outer air is introduced into a lower layer 62b from a discharging port 64a of the ventilation fan 64.

An evaporator 70 and discharging fans 72 are mounted in order from an upstream side of air flow in the lower layer 62b. Four discharging fans 72 are disposed in parallel in a vehicle width direction. Vents 74 are provided in a lower face of the lower layer 62b on an upstream side further than the evaporator 70, and air in the interior of the vehicle is introduced into the lower layer 62b through the vents 74 by operation of the discharging fans 72. The air in the interior of the vehicle and the outer air discharged from the discharging port 64a of the ventilation fan 64 pass through the evaporator 70, thereby being refrigerated at the evaporator 70 and then blown from outlets 76.

Figure 7:
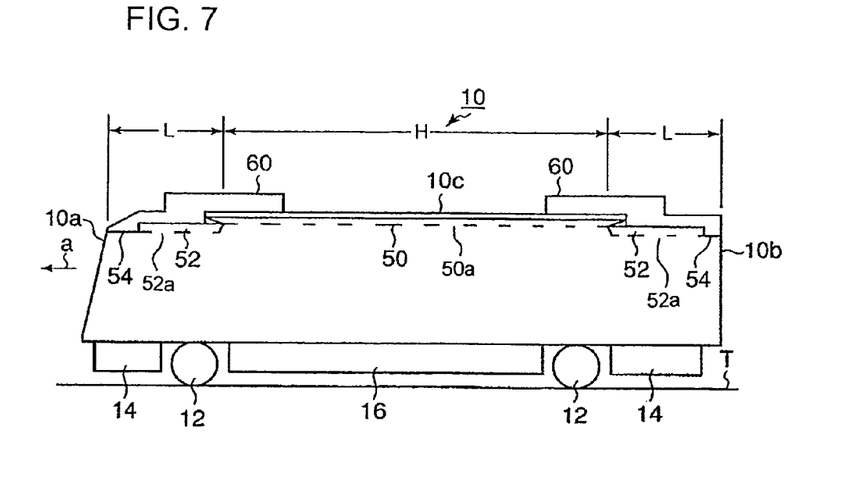
FIG. 7 is a cross-sectional view, as viewed in front, of a track system vehicle equipped with an air conditioner according to a second embodiment of the present invention.
Figure 8:
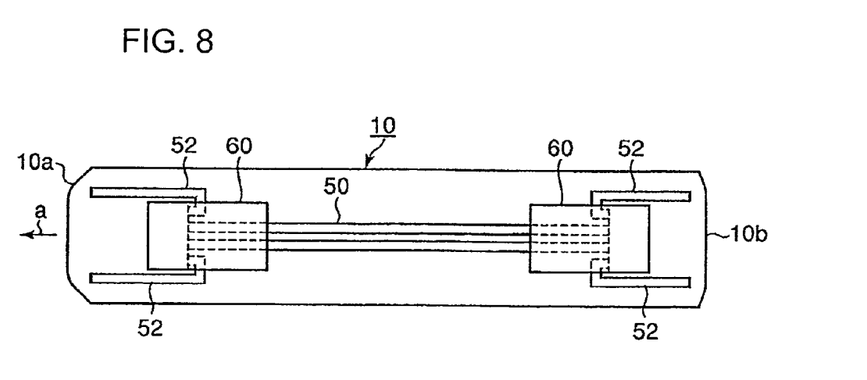
FIG. 8 is a cross-sectional view, as viewed in plan, of the track system vehicle concerning the second embodiment.
Figure 10:
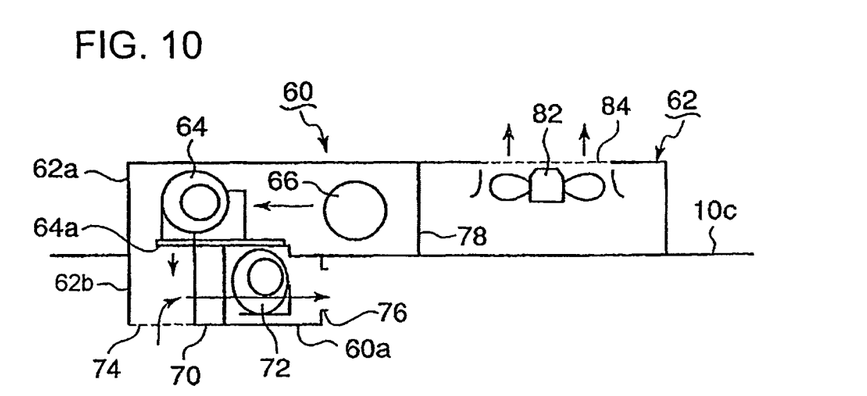
FIG. 10 is a cross-sectional view, as viewed in front, of the air conditioning unit according to the second embodiment.
Figure 11:
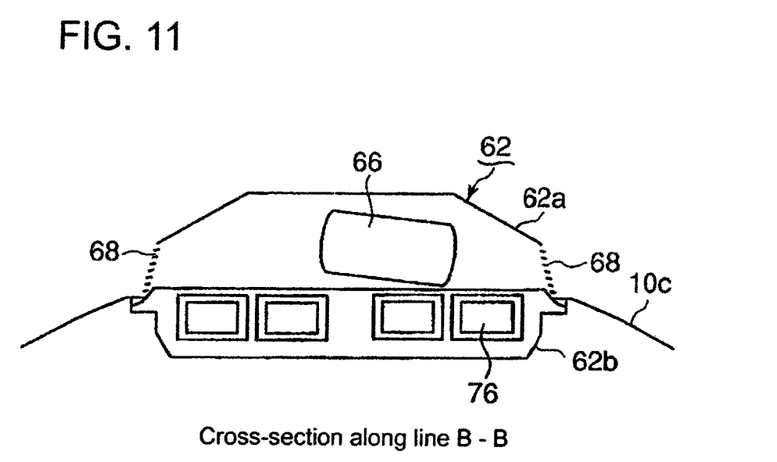
FIG. 11 is a cross-sectional view taken along line B-B of FIG. 9.
Figure 12:
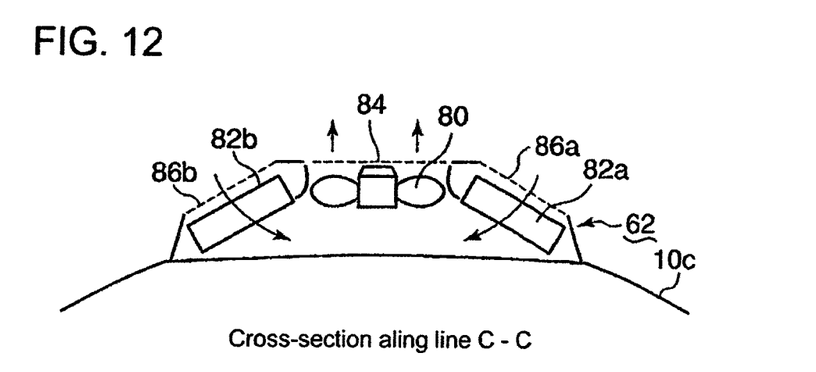
FIG. 12 is a cross-sectional view taken along line C-C of FIG. 9.

As illustrated in FIG. 11, four outlets 76 are disposed in a vehicle width direction. As illustrated in FIG. 10, the outlets 76 face in a horizontal direction and a vehicle center side, and as illustrated in FIGS. 7 and 8, the first duct 50 and the second duct 52 are connected to the outlets 76.

Figure 9:
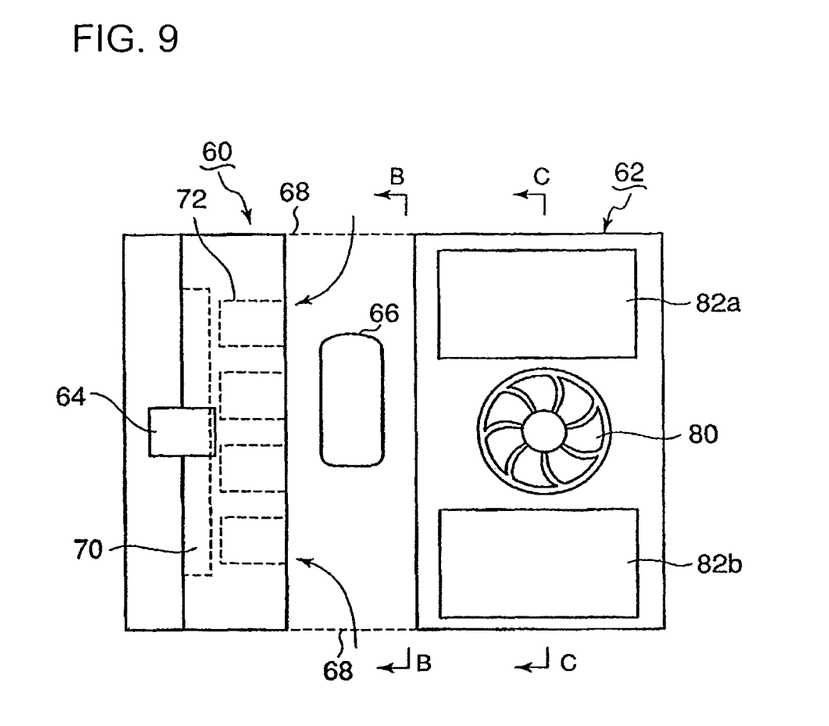
FIG. 9 is a cross-sectional view, as viewed in plan, of an air conditioning unit mounted on the track system vehicle concerning the second embodiment.

A fan 80 is disposed in the center of the upper layer 62a on a vehicle center side across a partition 78, and a pair of condensers 82a and 82b are disposed on both sides of the fan 80. Vents 84, 86a, and 86b are respectively provided in wall faces of the casing, which face the fan 80 and the condensers 82a and 82b. Outer air is introduced through the vents 86a and 86b by operation of the fan 80, and the introduced outer air refrigerates refrigerants which flow in the condensers 82a and 82b, and then, are discharged to the outside through the vent 84.

The casing 62 is mounted such that the lower layer 62b is embedded in the roof 10c and the upper layer 62a is protruded from the roof.

Similarly to the first embodiment, two air conditioning units 60 are mounted on the roof of the vehicle and on end sides of the vehicle, and the outlets 76 face the center side of the vehicle. Two outlets 76 on the inner side in a vehicle width direction are connected to the first ducts 50, and two outlets 76 on both end sides are connected to the second ducts 52 which are disposed to bypass from both sides of the air conditioning unit 60 to the end side of the vehicle. The first ducts 50 are embedded in the ceiling face so as not to protrude downward from the ceiling face, so that the ceiling face on the center side of the vehicle is made higher. The lower faces of the second ducts 52 are disposed so as to be flush with a lower face 60a of the air conditioning unit 60 on both sides of the air conditioning unit 60.

In such a configuration, in this embodiment, the air conditioning unit 60 is made into a 2-layered structure, so that the outlets 76 are able to be disposed on the end side of the vehicle, compared to the first embodiment. Therefore, the vehicle center side region H capable of forming a high ceiling face is able to be further enlarged, and the interior of the vehicle is able to be felt to be wider and higher, so that a feeling of comfort is able to be further felt, whereby ride quality is able to be improved.

Further, a refrigeration range on the vehicle center side in which the first ducts 50 with low pressure loss are disposed is enlarged, so that temperature distribution of the interior of the vehicle is able to be further equalized, whereby passengers' feeling of comfort is able to be increased.

Further, since the vehicle end side regions L are able to be narrowed, the second ducts 52 are able to be shortened, and accordingly, pressure losses in the second ducts 52 are able to be reduced, so that reduction in air volume is able to be prevented.

According the present invention, an air conditioner is able to be realized which allows a height of the track system vehicle to be kept low, allows an interior space of the vehicle to be maintained wide, and also, is able to perform uniform air-conditioning of the interior of the vehicle.

The invention claimed is:

1. An air conditioner of a track system vehicle, comprising:
two air conditioning units each of which has constituent devices disposed in parallel in a transverse direction and is mounted on a roof of the vehicle,
wherein each of the two air conditioning units is provided close to each of end portions in a longitudinal direction of the vehicle, respectively,
each of the two air conditioning units comprises a plurality of outlets for air-conditioned air disposed toward a center side in the longitudinal direction of the vehicle, respectively, such that the plurality of outlets of one air conditioning unit faces the plurality of outlets of the other air conditioning unit,
the plurality of outlets of each of the two air conditioning units is provided in parallel with a vehicle width direction, at least one pair of outlets is provided at a center side in the vehicle width direction and remaining of outlets are provided on both ends in the vehicle width direction, so that all air blown from the plurality of outlets provided at the center side in the vehicle width direction and on both ends in the vehicle width direction flows in the direction of the center in the longitudinal direction of the vehicle,
a first duct connecting the at least one pair of the outlets provided at the center side in the vehicle width direction facing each other, the first duct being disposed in the longitudinal direction of the vehicle along a back face of the roof and having air outlets which face downward,
second ducts connecting to the remaining outlets on both ends in the vehicle width direction, which bypass the air conditioning unit along the back face of the roof from the outlets, extend on the both sides of a casing of the air conditioning unit only to a vehicle end side, thereby being disposed up to a vehicle end, and have the air outlets which face downward, and
lower faces of the second ducts are disposed so as to be flush with a lower face of the casing of the air conditioning unit.

2. The air conditioner of a track system vehicle according to claim 1, wherein the air conditioning unit is 1-layered, and
a vehicle exterior air suction fan, a vehicle interior air suction fan, a discharging fan, and air-conditioned air outlets, out of the constituent devices are disposed in this order from the vehicle end side toward the center side in the longitudinal direction of the vehicle.

3. The air conditioner of a track system vehicle according to claim 1, wherein the air conditioning unit is 2-layered, and
a condenser, a compressor, and a vehicle exterior air suction fan, out of the constituent devices are disposed on an upper layer, and on a lower layer, a vehicle interior air suction fan, a discharging fan, and air-conditioned air outlets are disposed in this order from the vehicle end side toward the center side in the longitudinal direction of the vehicle.

4. An air conditioner of a track system vehicle, comprising:
a first air conditioning unit;
a second air conditioning unit present in parallel in a transverse direction to the first air conditioning unit;
a plurality of outlets through which air-conditioned air passes present on a first side of the first air conditioning unit and a first side of the second air conditioning unit;
a first duct extending at a center side in a vehicle width direction from the first side of the first air conditioning unit and the first side of the second air conditioning unit to connect the first air conditioning unit and the second air conditioning unit, and having a plurality of vents at a bottom of the first duct;
a second duct connecting to the plurality of outlets of the first air conditioning unit on an end in the vehicle width direction, by passing the air conditioning unit along the back face of the roof from the outlets, extending on the both sides of the air conditioning unit only to a vehicle end side, thereby being disposed up to a vehicle end and having the plurality of vents at a bottom of the second duct; and
a third duct connecting to the plurality of outlets of the second air conditioning unit on an end in the vehicle width direction, by passing the air conditioning unit along the back face of the roof from the outlets, extending on the both sides of the air conditioning unit only to a vehicle end side, thereby being disposed up to a vehicle end and having the plurality of vents at a bottom of the third duct, wherein the first air conditioning unit and the second air conditioning unit are present on a top surface of the vehicle at both ends in a longitudinal direction of the vehicle, respectively, the first side of the first air conditioning unit and the first side of the second air conditioning unit face to each other towards a center side in the longitudinal direction of the vehicle, respectively, the plurality of outlets is provided so that all air blown from the plurality of outlets provided at the center side in the vehicle width direction and on both ends in the vehicle width direction flows in the direction of the center in the longitudinal direction of the vehicle, lower faces of the second ducts are disposed so as to be flush with a lower face of a casing of the first air conditioning unit, and lower faces of the third ducts are disposed so as to be flush with a lower face of a casing of the second air conditioning unit.

5. The air conditioner of a track system vehicle according to claim 4, wherein the second duct has a corner portion so that the second duct goes around to a second side of the first air conditioning unit towards an end of the vehicle, and the second side of the first air conditioner unit is opposite to the first side of the first air conditioning unit.

6. The air conditioner of a track system vehicle according to claim 5, wherein the third duct has a corner portion so that the third duct goes around to a second side of the second air conditioning unit towards another end of the vehicle, and the second side of the second air conditioner unit is opposite to the first side of the second air conditioning unit.

7. The air conditioner of a track system vehicle according to claim 6, wherein the first duct, the second duct, and the third duct are aligned on a same horizontal plane.

8. The air conditioner of a track system vehicle according to claim 1, wherein the two air conditioning units further include another duct connecting to each other and having said at least one pair of outlets.

* * * * *